US008161647B2

(12) United States Patent
Noguchi

(10) Patent No.: US 8,161,647 B2
(45) Date of Patent: Apr. 24, 2012

(54) RECORDING HEAD AND METHOD FOR MANUFACTURING THE SAME

(75) Inventor: Mitsutoshi Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 12/484,880

(22) Filed: Jun. 15, 2009

(65) Prior Publication Data

US 2009/0309915 A1 Dec. 17, 2009

(30) Foreign Application Priority Data

Jun. 16, 2008 (JP) ................................. 2008-156648

(51) Int. Cl.

| | |
|---|---|
| ***B21D 53/76*** | (2006.01) |
| ***B23P 17/00*** | (2006.01) |
| ***B41J 2/015*** | (2006.01) |

(52) U.S. Cl. ........................................ 29/890.1; 347/20

(58) Field of Classification Search ................. 29/890.1, 29/825, 25.35; 347/20, 40, 44, 45, 65, 68–70; 310/311, 316.01, 317

See application file for complete search history.

(56) References Cited

U.S. PATENT DOCUMENTS 4,063,349 A * 12/1977 Passler et al. ................... 29/841
4,768,286 A * 9/1988 Ketcham ......................... 29/841
5,285,559 A * 2/1994 Thompson et al. ............. 29/841
5,331,203 A * 7/1994 Wojnarowski et al. ........ 257/698
5,412,247 A * 5/1995 Martin .......................... 257/678
5,461,545 A * 10/1995 Leroy et al. .................... 361/765
5,547,730 A * 8/1996 Weiblen et al. ................. 428/76
5,700,981 A * 12/1997 Tuttle et al. .................... 174/250
5,786,631 A * 7/1998 Fishley et al. ................. 257/701
5,795,799 A * 8/1998 Hosoya ......................... 438/126
5,973,263 A * 10/1999 Tuttle et al. .................... 174/523
6,187,653 B1 * 2/2001 Hui et al. ....................... 438/455
6,232,153 B1 * 5/2001 Mitra et al. ................... 438/127
6,365,979 B1 * 4/2002 Miyajima ...................... 257/787
6,471,901 B1 * 10/2002 Kawamura et al. ........... 264/267
6,472,598 B1 * 10/2002 Glenn ........................... 174/535
6,562,663 B2 * 5/2003 Scheifers et al. ............. 438/127
6,601,293 B1 * 8/2003 Glenn ............................. 29/841
6,609,782 B2 * 8/2003 Mori ............................... 347/50
6,896,359 B1 * 5/2005 Miyazaki et al. ............... 347/58
6,935,726 B2 * 8/2005 Watanabe ....................... 347/58
7,018,503 B2 * 3/2006 Murthy et al. ................ 156/291
7,153,459 B2 * 12/2006 Kitahara ....................... 264/238
7,480,994 B2 * 1/2009 Wood et al. .................. 29/890.1
7,533,960 B2 * 5/2009 Yasuda et al. ................... 347/40
7,625,072 B2 * 12/2009 Saito et al. ...................... 347/63

(Continued)

FOREIGN PATENT DOCUMENTS

JP 2001-130001 5/2001

*Primary Examiner* — David Angwin

(74) *Attorney, Agent, or Firm* — Canon USA Inc IP Division

(57) ABSTRACT

A method for manufacturing a recording head includes providing a recording element substrate and a circuit board having an inner lead connector, the recording element substrate including an energy generating element configured to generate energy used to discharge ink and an electrical connector to be electrically connected to the element, bonding the electrical connector of the recording element substrate to the inner lead connector of the circuit board, and applying a thixotropic sealant to the inner lead connector to seal the inner lead while exerting shear force on the sealant by ultrasonic vibration.

5 Claims, 4 Drawing Sheets

U.S. PATENT DOCUMENTS 7,690,767 B2 * 4/2010 Hirosawa et al. ............... 347/56
7,722,917 B2 * 5/2010 Shimomura et al. ............ 427/58
7,789,488 B2 * 9/2010 Mori ............................... 347/50
7,794,058 B2 * 9/2010 Seida et al. ..................... 347/62
8,034,399 B2 * 10/2011 Shimomura et al. ............ 427/58
2003/0041455 A1 * 3/2003 Akhavain et al. ............ 29/890.1

* cited by examiner

RECORDING HEAD AND METHOD FOR MANUFACTURING THE SAME

BACKGROUND OF THE INVENTION

1. Field of the Invention

The present invention relates to a recording head for discharging ink onto a recording medium and a method for manufacturing the recording head.

2. Description of the Related Art

Recording heads of inkjet recorders include a recording element substrate, which includes a discharge unit for discharging ink, in a nozzle communicating with a discharge port. Known examples of the discharge unit include electromechanical transducers, such as a piezoelectric element, electrothermal transducers, such as a heating resistor, and electromagnetic-mechanical transducers and electromagnetic-thermal transducers for radio waves and a laser.

One of representative recording heads includes an electrothermal transducer as a discharge unit. FIG. 1 illustrates a recording head of this type. This recording head includes a chip unit 6, which includes a flexible circuit board 1, a recording element substrate 3, a frame member 4, and a supporting substrate 5. The flexible circuit board 1 includes a path through which an electric signal for discharging ink is sent to the recording element substrate 3. For example, the flexible circuit board 1 includes copper wiring on a polyimide film. The recording element substrate 3 includes an ink-supply port formed, for example, by anisotropic etching, and an ink path and a discharge port formed by photolithography. The recording element substrate 3, together with the frame member 4 serving as a supplementary member, is mounted on the supporting substrate 5. The recording element substrate 3 is electrically connected to the flexible circuit board 1 through an inner lead 2 disposed on the flexible circuit board 1. This electrically connected portion must be sealed to prevent corrosion and short circuits caused by ink and other extraneous substances. Various types of sealants are used depending on the material and shape of a portion to be sealed and the intended application.

Japanese Patent Laid-Open No. 2001-130001 discloses a technique for sealing a connection between a recording element substrate and a flexible circuit board, in which two different sealants are respectively applied to the two sides of an inner lead.

A sealant is required not only to seal an electrically connected portion, but also not to become detached from the electrically connected portion due to scrubbing with a blade or wiper for cleaning the top surface of a head substrate on which an ink nozzle is disposed or due to contact with paper due to paper jamming. Thus, there is a demand for high-modulus sealants.

Furthermore, a sealant should have a low viscosity (high flowability) to seal the underside of an inner lead. This is because a sealant seals the underside of an inner lead through a very small gap between inner leads. On the other hand, a sealant should have a high viscosity to seal the topside of the inner lead. A sealant must be applied to an inner lead to properly remain on the topside of the inner lead. A sealant having a low viscosity may flow to an unintended portion and may incompletely seal the topside of the inner lead.

Two sealants that satisfy these different requirements have therefore been used to seal the topside and underside of an inner lead, thus making the sealing process complicated. More specifically, after a sealant applied to the underside of an inner lead is heat-cured, another sealant is applied to the topside of the inner lead and is again heat-cured.

SUMMARY OF THE INVENTION

According to an aspect of the invention, a method for manufacturing a recording head is provided that includes providing a recording element substrate and a circuit board having an inner lead connector, the recording element substrate including an energy generating element configured to generate energy used to discharge ink and an electrical connector to be electrically connected to the energy generating element; bonding the electrical connector of the recording element substrate to the inner lead connector of the circuit board; and applying a thixotropic sealant to the inner lead connector to seal the inner lead while exerting shear force on the sealant.

Further features of the present invention will become apparent from the following description of exemplary embodiments with reference to the attached drawings.

DESCRIPTION OF THE EMBODIMENTS

Embodiments of the present invention will be described below with reference to the drawings.

FIGS. 2A to 2D are perspective views illustrating the production flow of a chip unit of a recording head according to an embodiment of the present invention.

Figure 2A:
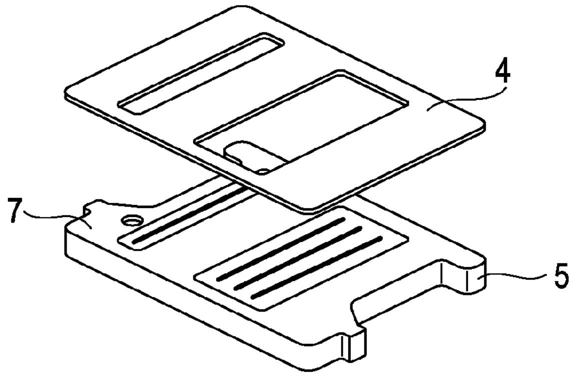
FIGS. 2A to 2D are perspective views illustrating the production flow of a chip unit of a recording head according to an embodiment of the present invention.

FIG. 2A illustrates a process of bonding a frame member 4. An adhesive 7 is applied to an alumina supporting substrate 5. An alumina frame member 4 is placed on the supporting substrate 5 in a predetermined position. The adhesive 7 is then heat-cured.

Figure 2B:
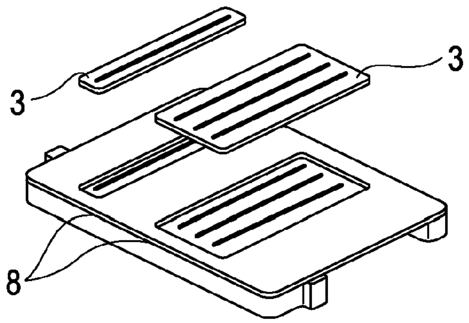

FIG. 2B illustrates a chip mounting process. After the process of bonding the frame member 4, a plurality of recording element substrates 3 that include an element for generating energy used to discharge liquid are placed on the supporting substrate 5 in predetermined positions. An adhesive 8 is previously applied to the supporting substrate 5 by a transferring method.

Figure 2C:
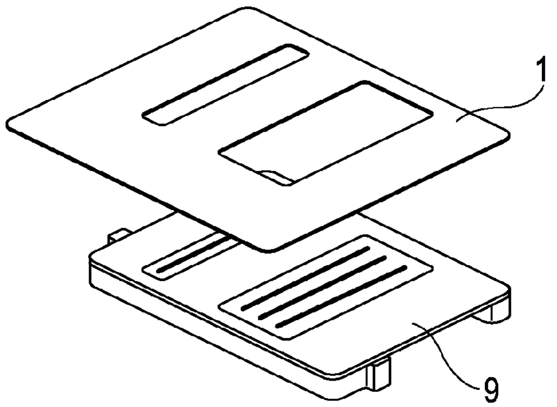

FIG. 2C illustrates tape automated bonding (TAB) and a bonding process of a flexible circuit board 1. An adhesive 9 is applied to a chip mount unit prepared by the chip mounting process. A flexible circuit board 1 is placed on the chip mount unit in a predetermined position. The adhesive 9 is then heat-cured. Inner leads of the flexible circuit board 1 are individually connected to their respective gold bumps by bonding. The gold bumps are electrical connectors previously formed on the recording element substrates 3.

Figure 2D:
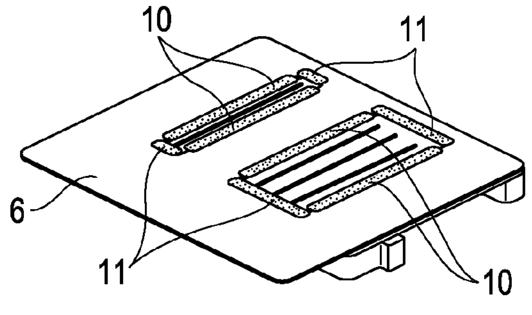

FIG. 2D illustrates a sealing process of an electrically connected portion. A thixotropic sealant is used to seal an electrically connected portion. The sealant is applied to inner lead connectors to seal the inner lead connectors while exerting shear force on the sealant. Thus, a single sealant can be applied to both the underside and the topside of the inner lead. This simplifies the sealing process and improves productivity.

The gap between inner leads on a flexible circuit board for use in a recording head generally ranges from 50 to 150 μm. When the gap between inner leads is 100 μm, a sealant may have a viscosity (measured at 20 rpm; the same shall apply hereinafter.) of at least 110 Pa·s or in the range of 150 to 10,000 Pa·s. These viscosities are determined such that the sealant can be deposited on an inner lead to seal both the topside and the underside of the inner lead after the application of shear force described below is completed.

First, a sealant is injected into a portion 10 on the underside of an inner lead in an electrically connected portion to seal the underside of the inner lead. Since the gap between inner leads is as small as about 100 μm, the sealant should have a low viscosity and high fluidity. To seal the underside of an inner lead, shear force is exerted on a sealant to reduce the viscosity of the sealant. When the gap between inner leads is 100 μm, a sealant may have a viscosity of not more than 100 Pa·s or in the range of 2 to 70 Pa·s. At a viscosity above 100 Pa·s, it takes a long time to apply a sealant to the underside of an inner lead. This may reduce the productivity or result in incomplete sealing. A sealant having a viscosity below 2 Pa·s may flow to an unintended portion, resulting in incomplete sealing.

The sealant is then applied to a portion 11 on the topside of the inner lead in the electrically connected portion to seal the topside of the inner lead. The sealant should have a high viscosity to remain on the topside of the inner lead and not to flow to an unintended portion. Thus, to seal the topside of an inner lead, shear force exerted on a sealant is controlled to give high viscosity. When the gap between inner leads is 100 μm, a sealant may have a viscosity of at least 110 Pa·s or in the range of 150 to Pa·s. A sealant having a viscosity below 110 Pa·s may flow to an unintended portion. Thus, an intended inner lead connector may be sealed incompletely with the sealant. A sealant having a viscosity above 10,000 Pa·s may be difficult to apply, thus reducing productivity.

The sealing process is performed continuously. A sealant having a low viscosity to seal the underside of an inner lead is controlled to have a higher viscosity with time so as to remain on the topside of the inner lead and not to flow to an unintended portion. The sealing process may be performed for inner leads having a gap in the range of 50 to 150 μm, which is a general range in inner leads of a flexible circuit board for use in a recording head.

The sealant is then heat-cured to complete a chip unit 6.

Figure 3:
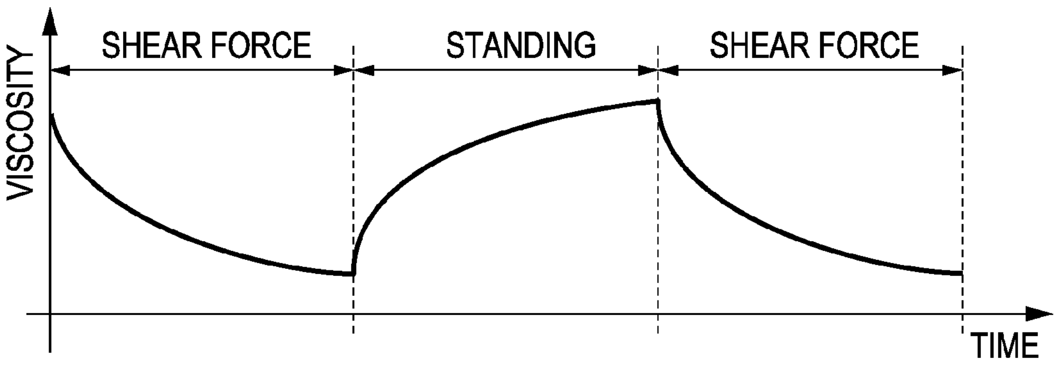
FIG. 3 is a graph showing the viscosity of a thixotropic sealant as a function of time.
Figure 4:
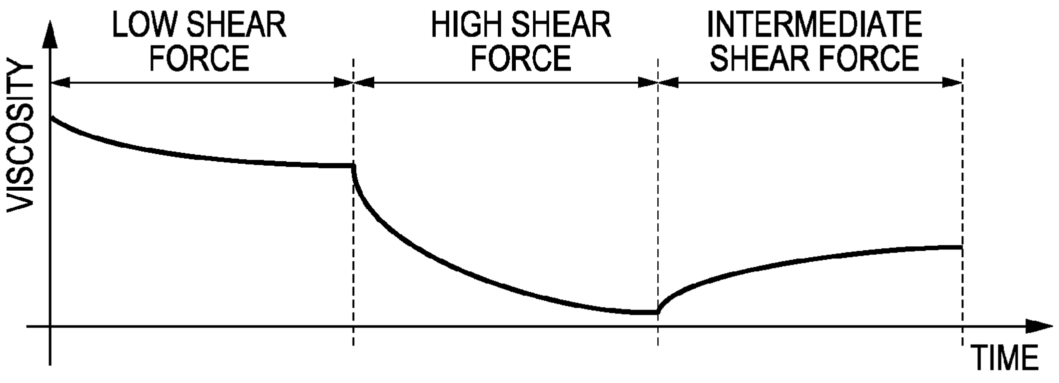
FIG. 4 is a graph showing the viscosity of a thixotropic sealant as a function of shear force.

Thixotropy refers to a time-dependent or shear-rate-dependent change in viscosity. More specifically, as shown in FIG. 3, the viscosity decreases with increasing shear force. When a fluid is left standing, the viscosity recovers. As shown in FIG. 4, the viscosity changes in response to changes in shear force. The viscosity of a thixotropic material decreases with increasing shear force or shear rate. The viscosity change has hysteresis.

Shear force refers to force that causes a shear within a material. Two parallel but opposite forces generate shear force at a cross section in a material. The apparent viscosity of a thixotropic material decreases in response to shear force exerted on the material. While various mechanisms of thixotropy have been proposed, basically, the destruction of an aggregate structure of internal filler by shear force causes thixotropy.

Thus, the viscosity of a thixotropic sealant can be controlled by altering shear force.

Shear force can be exerted on a sealant by ultrasonic vibration. Ultrasonic vibration can be generated by a general ultrasonic transducer. An ultrasonic transducer converts electrical energy into ultrasonic mechanical vibration, which can exert shear force on a sealant through a horn. Examples of the ultrasonic transducer include a magnetostrictive vibrator and an electrostrictive vibrator. In the magnetostrictive vibrator, a ferromagnetic substance, such as nickel, expands and contracts in an alternating magnetic field. In the electrostrictive vibrator, ferroelectric substance, such as lead zirconium titanate, expands and contracts with alternating voltages. The electrostrictive vibrator is also called a piezoelectric element.

Ultrasonic vibration generated by an ultrasonic transducer is transmitted to a horn connected to the ultrasonic transducer. The tip of the horn vibrates at an ultrasonic frequency. Ultrasonic vibration generated by an ultrasonic transducer has an amplitude in the range of only several micrometers to several tens of micrometers. Thus, the amplitude is amplified with a horn. Ultrasonic waves have frequencies above those of audible sound for human (about 20 kHz or more). In the present invention, a general ultrasonic transducer for a frequency in the range of 20 kHz to 5 MHz can be used on condition that the ultrasonic transducer does not adversely affect the advantages of the present invention.

A unit for exerting shear force on a sealant, such as an ultrasonic transducer, may be installed at any place provided that the shear force can be exerted on the sealant. An additional material may be interposed between the unit and the sealant provided that the shear force can be exerted on the sealant.

For example, a unit for exerting shear force on a sealant, such as an ultrasonic transducer, may be installed on an applicator for applying the sealant, such as a dispenser. In this case, before being discharged from the applicator, the sealant undergoes shear force by ultrasonic vibration to have a low viscosity suitable to seal the underside of an inner lead. After the sealant is applied to the underside of the inner lead through a gap between inner leads, the shear force exerted on the sealant is reduced or set to zero so that the sealant has a high viscosity suitable to seal the topside of the inner lead. The viscosity of the sealant applied to the underside of the inner lead increases with time. Thus, the sealant can sufficiently seal the underside of the inner lead. The sealant applied to the topside of the inner lead has a high viscosity and does not flow into a gap between inner leads, thus sufficiently sealing the topside of the inner lead.

A unit for exerting shear force on a sealant, such as an ultrasonic transducer, may be installed on a substrate to be sealed. In this case, a sealant discharged from an applicator has a high viscosity suitable to seal the topside of an inner lead. However, the sealant applied to the inner lead undergoes shear force by ultrasonic vibration from the substrate. As a result, the sealant has a low viscosity suitable to seal the underside of the inner lead, flowing to the underside of the inner lead through a gap between inner leads. The shear force exerted on the sealant is subsequently reduced or set to zero so that the sealant has a high viscosity suitable to seal the topside of the inner lead. The viscosity of the sealant applied to the underside of the inner lead increases with time. Thus, the sealant can sufficiently seal the underside of the inner lead. The sealant applied to the topside of the inner lead has a high viscosity and does not flow into a gap between inner leads, thus sufficiently sealing the topside of the inner lead.

The shear force from the substrate may be exerted on the sealant during and/or after the application of the sealant to the substrate.

To accelerate a reduction in viscosity of the sealant, the sealant may be heated to such an extent that the sealant is not cured.

A thixotropic sealant may be mainly composed of an epoxy resin in view of ink resistance, adhesion, and reactivity. If necessary, a sealant may contain a curing agent, a curing accelerator, and filler that imparts thixotropy to the sealant.

The epoxy resin may be a general-purpose bisphenol A diglycidyl ether. A sealant may contain another epoxy compound on condition that the epoxy compound does not adversely affect the advantages of the present invention. Examples of that other epoxy compound include resins, including hydrogenated bisphenol A diglycidyl ether, bisphenol epoxy resins produced from dihydric phenols, such as bisphenol F, and epichlorohydrin, alicyclic epoxy resins, glycidyl ester epoxy resins, glycidyl ether epoxy resins of long-chain polyols, novolak epoxy resins, and polyolefin epoxy resins, and reactive diluents, such as monoepoxide and polyepoxide each having a relatively low viscosity.

The curing agent may be an acid anhydride or an amine. Acid anhydride curing agents have high ink resistance, adhesion, and reactivity. Acid anhydride curing agents include phthalic anhydride, tetrahydrophthalic anhydride, methyltetrahydrophthalic anhydride, hexahydrophthalic anhydride, methylhexahydrophthalic anhydride, trimellitic anhydride, pyromellitic dianhydride, methyl-5-norbornene-2,3-dicarboxylic anhydride (methyl Himic (trade name) anhydride), and maleic anhydride. Acid anhydride curing agents may be used in combination.

Examples of the curing accelerator include tertiary amines, such as benzyldimethylamine, tris(dimethylaminomethyl) phenol, and diazabicycloundecene (DBU); quaternary phosphonium salts, such as tetrahydrophosphonium bromide; quaternary ammonium salts; imidazoles, such as 2-ethyl-4-methylimidazole and 1-benzyl-2-phenylimidazole; and latent curing accelerators, such as epoxy-amine adducts and urea adducts.

Examples of filler include silica, aluminum hydroxide, and glass frit. The amount of filler in a sealant may range from 0 to 500 parts by mass or 0 to 300 parts by mass per 100 parts by mass of mixture of an epoxy resin and a curing agent. Filler may have an average particle size of 20 μm or less to increase the strength of a sealant. To impart thixotropy to a sealant, the amount of filler having an average primary particle size of 50 nm or less may range from 0 to 10 parts by mass per 100 parts by mass of mixture of an epoxy resin and a curing agent. A sealant may appropriately contain filler to have a thixotropy index (TI) of more than 1.0 but less than 20. TI is the ratio of viscosities at rotation speeds a and b and is a measure of thixotropy.

EXAMPLES

Examples of the present invention will be described in detail below with reference to the drawings.

Example 1

Figure 5:
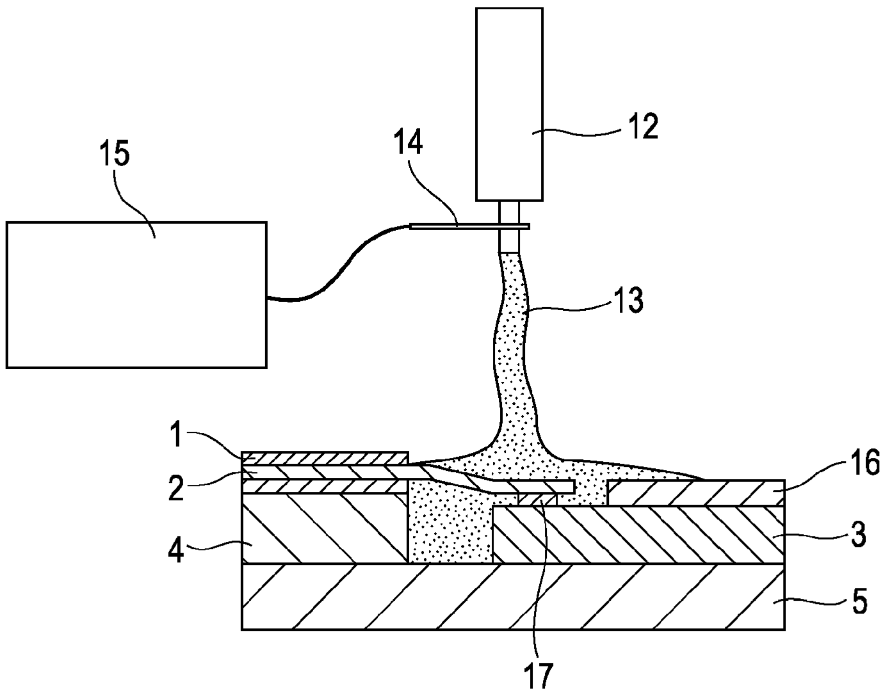
FIG. 5 is a schematic view illustrating a sealing process in a manufacturing method according to an embodiment of the present invention.

FIG. 5 is a schematic view of a sealing process in a manufacturing method according to an embodiment of the present invention. A thixotropic sealant 13 is being applied to an electrically connected portion in which a recording element substrate 3 is connected to an inner lead 2 of a flexible circuit board 1 through a bump 17. A flow passage forming member 16 is disposed on the recording element substrate 3. These components and a frame member 4 are disposed on a supporting substrate 5. Shear force generated by an ultrasonic wave from an ultrasonic transducer 14 installed on a dispenser 12 can be exerted on the sealant 13 discharged from the dispenser 12. The shear force is controlled with an ultrasonic transducer controller 15.

In the present example, the sealing process illustrated in FIG. 5 was performed after the bonding process of a frame member, the chip mounting process, and the tape automated bonding (TAB) and a bonding process of a flexible circuit board illustrated in FIG. 2. The sealing process will be described in detail below.

A resin composition composed of the following components was charged into the dispenser 12, which includes the ultrasonic transducer 14.

Bisphenol A glycidyl ether epoxy resin (trade name: EP-4100, manufactured by ADEKA Co.) 20 parts by mass Methylhexahydrophthalic anhydride (trade name: Rikacid MH700, manufactured by New Japan Chemical Co., Ltd.) 20 parts by mass Crystalline silica (trade name: F8, manufactured by Nitchitsu Co., Ltd., average particle size: 8 μm) 60 parts by mass Fine silica particles (trade name: 200, manufactured by Nippon Aerosil Co., Ltd., average particle size: 12 nm) 2 parts by mass Curing accelerator (trade name: 1B2PZ, manufactured by Shikoku Chemicals Co.) 0.3 parts by mass The frequency of the ultrasonic transducer 14 was 1 MHz. The amplitude was controlled with the ultrasonic transducer controller 15. Ultrasonic vibration was applied to the resin composition. An electric power applied to the ultrasonic transducer 14 was altered to control the shear force exerted on the resin composition. The viscosity of the resin composition was controlled within the range of 30 to 300 Pa·s.

In the sealing process, the ultrasonic transducer 14 exerted shear force on the resin composition to control the viscosity of the resin composition. To seal the underside of the inner lead 2, the viscosity of the resin composition was adjusted to 30 Pa·s to allow the resin composition to flow between inner leads. One second after that, the viscosity of the resin composition was adjusted to 120 Pa·s to deposit the resin composition gradually on the underside of the inner lead 2. To seal the topside of the inner lead 2, the viscosity of the resin composition was adjusted to 300 Pa·s. Thus, the topside and underside of the inner lead 2 were sealed.

Figure 1:
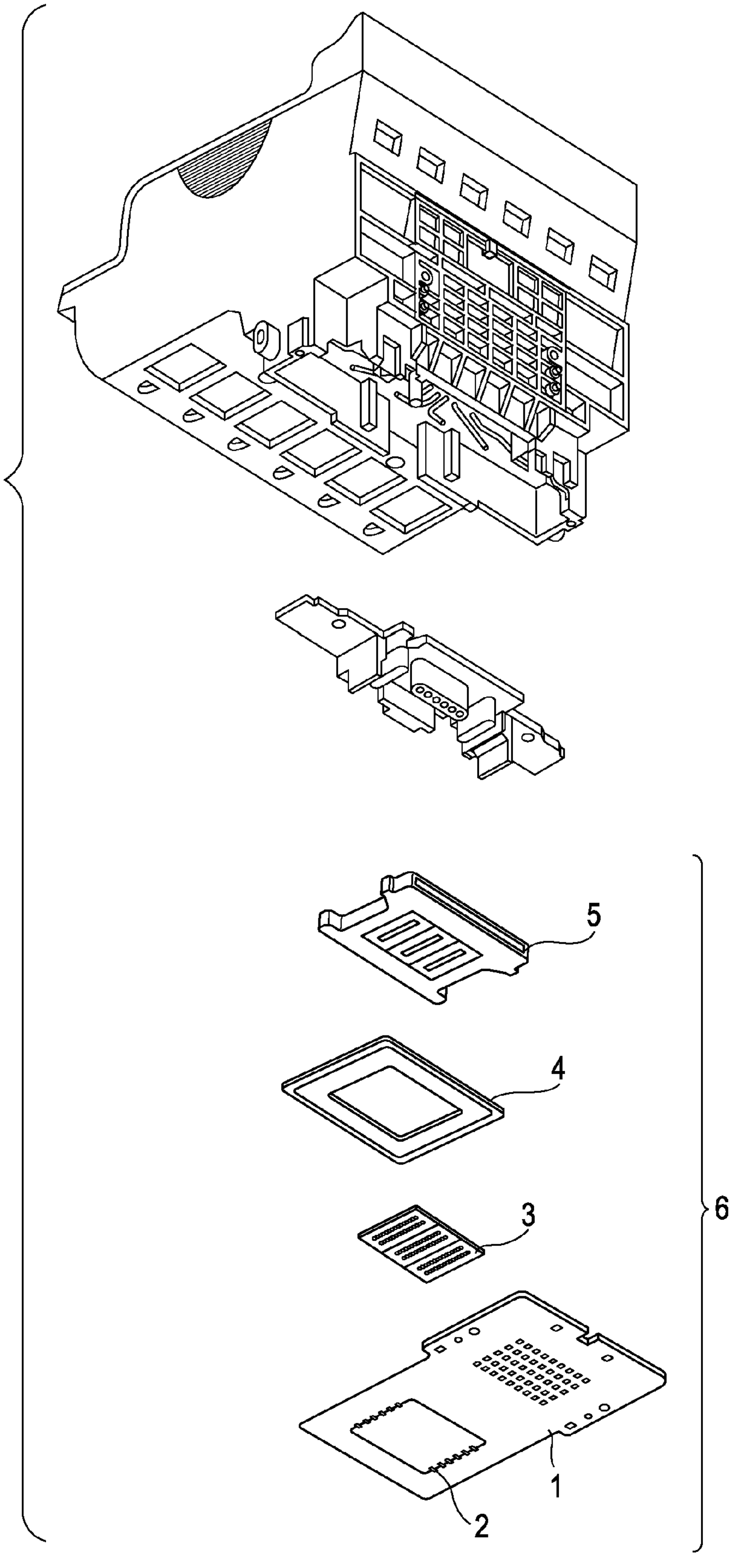
FIG. 1 is a perspective view of a recording head according to an embodiment of the present invention.

A recording head as illustrated in FIG. 1 was manufactured using a chip unit in which an inner lead connector was sealed as described above.

Example 2

Figure 6:
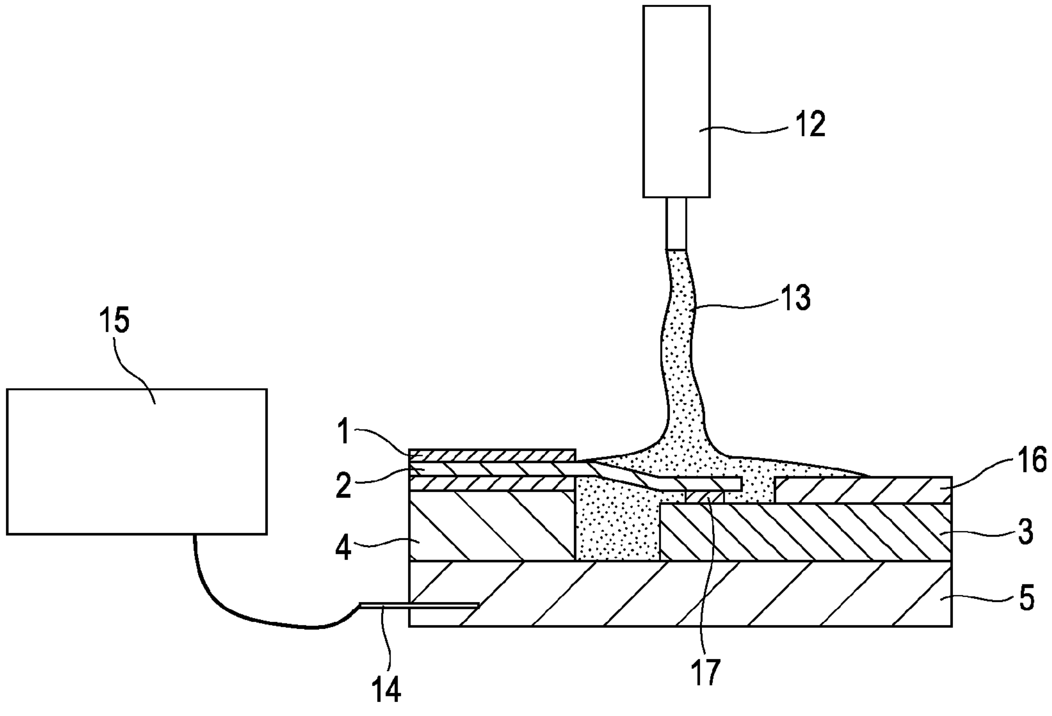
FIG. 6 is a schematic view illustrating a sealing process in a manufacturing method according to another embodiment of the present invention.

FIG. 6 is a schematic view of a sealing process in a manufacturing method according to another embodiment of the present invention. A thixotropic sealant 13 is being applied to an electrically connected portion in which a recording element substrate 3 is connected to an inner lead 2 of a flexible circuit board 1 through a bump 17. A flow passage forming member 16 is disposed on the recording element substrate 3. These components and a frame member 4 are disposed on a supporting substrate 5. Shear force generated by an ultrasonic wave from an ultrasonic transducer 14 installed on the supporting substrate 5 can be exerted on the sealant 13 discharged from a dispenser 12. The shear force is controlled by an ultrasonic transducer controller 15.

In the present example, the sealing process illustrated in FIG. 6 was performed after the bonding process of a frame member, the chip mounting process, and the tape automated bonding (TAB) and a bonding process of a flexible circuit board. The sealing process will be described in detail below.

A resin composition composed of the following components was charged into the dispenser 12.

Bisphenol A glycidyl ether epoxy resin (trade name: EP-4100, manufactured by ADEKA Co.) 25 parts by mass Methylhexahydrophthalic anhydride (trade name: Rikacid MH700, manufactured by New Japan Chemical Co., Ltd.) 20 parts by mass Crystalline silica (trade name: F8, manufactured by Nitchitsu Co., Ltd., average particle size: 8 μm) 65 parts by mass Fine silica particles (trade name: 200, manufactured by Nippon Aerosil Co., Ltd., average particle size: 12 nm) 3 parts by mass Curing accelerator (trade name: 1B2PZ, manufactured by Shikoku Chemicals Co.) 0.2 parts by mass The ultrasonic transducer 14 was installed on the supporting substrate 15. The frequency of the ultrasonic transducer 14 was 200 kHz. The amplitude was controlled with the ultrasonic transducer controller 15. Ultrasonic vibration was applied to the resin composition. An electric power applied to the ultrasonic transducer was altered to control the shear force exerted on the resin composition. The viscosity of the resin composition was controlled within the range of 25 to 290 Pa·s.

While ultrasonic vibration was applied to the supporting substrate 5 to adjust the viscosity of the resin composition to 25 Pa·s, the resin composition having a viscosity of 250 Pa·s was applied to an inner lead connector. The resin composition was initially deposited on the topside of the inner lead 2. On contact with the supporting substrate 5, the viscosity of the resin composition decreased, and the resin composition flowed to the underside of the inner lead 2. Three seconds after that, the viscosity of the resin composition was adjusted to 110 Pa·s to deposit the resin composition on the underside of the inner lead 2. To seal the topside of the inner lead 2, the viscosity of the resin composition was adjusted to 290 Pa·s. Thus, the topside and underside of the inner lead 2 were sealed.

A recording head as illustrated in FIG. 1 was manufactured using a chip unit in which the inner lead connector was sealed as described above.

Example 3

A resin composition composed of the following components was charged into four syringes.

Bisphenol A glycidyl ether epoxy resin (trade name: EP-4100, manufactured by ADEKA Co.) 20 parts by mass Methylhexahydrophthalic anhydride (trade name: Rikacid MH700, manufactured by New Japan Chemical Co., Ltd.) 20 parts by mass Crystalline silica (trade name: F8, manufactured by Nitchitsu Co., Ltd., average particle size: 8 μm) 65 parts by mass Fine silica particles (trade name: 200, manufactured by Nippon Aerosil Co., Ltd., average particle size: 12 nm) 1.5 parts by mass Curing accelerator (trade name: 1B2PZ, manufactured by Shikoku Chemicals Co.) 0.3 parts by mass Four chip units to be sealed were placed in a water tank provided with an ultrasonic transducer. Ultrasonic vibration was transmitted to all the four chip units via water. The frequency of the ultrasonic transducer was 150 kHz. The amplitude was controlled with an ultrasonic transducer controller. Ultrasonic vibration was applied to the resin composition. An electric power applied to the ultrasonic transducer was altered to control the shear force exerted on the resin composition. The viscosity of the resin composition was controlled within the range of 20 to 280 Pa·s.

While ultrasonic vibration was applied to the water tank to adjust the viscosity of the resin composition to 20 Pa·s, the resin composition having a viscosity of 240 Pa·s was simultaneously applied to four inner leads. Although the resin composition was initially deposited on the topside of an inner lead, the viscosity of the resin composition decreased in the water tank, and the resin composition flowed to the underside of the inner lead. Four seconds after that, the viscosity of the resin composition was adjusted to 105 Pa s to deposit the resin composition on the underside of the inner lead. To seal the topside of the inner lead, the viscosity of the resin composition was adjusted to 240 Pa·s. Thus, the topside and underside of the inner lead were sealed.

A recording head as illustrated in FIG. 1 was manufactured using a chip unit in which an inner lead connector was sealed as described above.

Comparative Example 1

A resin composition composed of the following components was charged into a syringe.

Bisphenol A glycidyl ether epoxy resin (trade name: EP-4100, manufactured by ADEKA Co.) 30 parts by mass Methylhexahydrophthalic anhydride (trade name: Rikacid MH700, manufactured by New Japan Chemical Co., Ltd.) 20 parts by mass Curing accelerator (trade name: 1B2PZ, manufactured by Shikoku Chemicals Co.) 0.2 parts by mass An inner lead was sealed without the application of shear force to the resin composition. A recording head as illustrated in FIG. 1 was manufactured using a chip unit in which an inner lead connector was sealed as described above.

Comparative Example 2

A resin composition composed of the following components was charged into a syringe.

Bisphenol A glycidyl ether epoxy resin (trade name: EP-4100, manufactured by ADEKA Co.) 15 parts by mass Methylhexahydrophthalic anhydride (trade name: Rikacid MH700, manufactured by New Japan Chemical Co., Ltd.) 20 parts by mass Crystalline silica (trade name: F8, manufactured by Nitchitsu Co., Ltd., average particle size: 8 μm) 100 parts by mass Fine silica particles (trade name: 200, manufactured by Nippon Aerosil Co., Ltd., average particle size: 12 nm) 5 parts by mass Curing accelerator (trade name: 1B2PZ, manufactured by Shikoku Chemicals Co.) 0.5 parts by mass An inner lead was sealed without the application of shear force to the resin composition. A recording head as illustrated in FIG. 1 was manufactured using a chip unit in which an inner lead connector was sealed as described above.

Evaluation

Reliability evaluation was performed with the recording heads manufactured in Examples 1 to 3 and Comparative Examples 1 and 2. More specifically, a printing durability test with about 10,000 pieces of paper was performed.

In the recording heads manufactured in Examples 1 to 3, the sealant did not become detached from the recording heads, and no abnormality was observed. The results demonstrated that a satisfactorily reliable recording head can be manufactured by a method for manufacturing a recording head according to the present invention. A recording head was disassembled after the printing durability test to examine the sealing of an inner lead connector. The recording heads manufactured in Examples 1 to 3 had no abnormality.

In the recording heads manufactured in Comparative Examples 1 and 2, a defect, such as a void in a sealant or an unsealed portion of an inner lead, was observed on the topside or underside of the inner lead. The results demonstrated that the topside and underside of an inner lead connector can be satisfactorily sealed by a method for manufacturing a recording head according to the present invention. Accordingly, the above-described embodiments can provide a reliable recording head and a method for manufacturing a recording head in which a sealant can seal an inner lead and rarely becomes detached from the inner lead, thus resulting in a simple sealing process and improved productivity.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-156648 filed Jun. 16, 2008, which is hereby incorporated by reference herein in its entirety.

What is claimed is:

1. A method for manufacturing a recording head, comprising:

providing a recording element substrate and a circuit board having an inner lead connector, the recording element substrate including an energy generating element configured to generate energy used to discharge ink and an electrical connector to be electrically connected to the energy generating element;

bonding the electrical connector of the recording element substrate to the inner lead connector of the circuit board; and applying a thixotropic sealant to the inner lead connector to seal the inner lead while exerting a shear force on the sealant by ultrasonic vibration.

2. The method for manufacturing a recording head according to claim 1, wherein a unit configured to exert the shear force on the sealant is installed in an apparatus configured to apply the sealant.

3. The method for manufacturing a recording head according to claim 1, wherein a unit configured to exert the shear force on the sealant is installed on a substrate to which the sealant is to be applied.

4. The method for manufacturing a recording head according to claim 1, further comprising:

exerting a first shear force on the sealant; and subsequently exerting a second shear force on the sealant, the second shear force being smaller than the first shear force.

5. A recording head manufactured by the method for manufacturing a recording head according to claim 1.

* * * * *